United States Patent [19]

Nixon, Jr.

[11] 4,162,619

[45] Jul. 31, 1979

[54] DRILL STRING SHOCK SUB

[75] Inventor: Jeddy D. Nixon, Jr., Houston, Tex.

[73] Assignee: Maurer Engineering, Inc., Houston, Tex.

[21] Appl. No.: 875,991

[22] Filed: Feb. 8, 1978

[51] Int. Cl.² .................... F16D 3/17; E21B 17/42
[52] U.S. Cl. ............................. 64/23; 64/27 R; 175/321
[58] Field of Search ................. 175/321; 64/23, 27 R, 64/27 NM

[56] References Cited

U.S. PATENT DOCUMENTS

| | | | |
|---|---|---|---|
| 2,240,519 | 5/1941 | Reed | 175/321 |
| 2,570,577 | 10/1951 | Manion | 64/27 R |
| 2,795,398 | 6/1957 | Ragland | 64/23 |
| 3,073,134 | 1/1963 | Mann | 64/23 |
| 3,099,918 | 8/1963 | Garrett | 64/23 |
| 3,383,126 | 5/1968 | Salvatori | 175/321 |
| 3,503,224 | 3/1970 | Davidescu | 64/27 R |
| 3,933,012 | 1/1976 | Ketchum | 64/27 R |
| 3,949,150 | 4/1976 | Mason | 64/23 |

FOREIGN PATENT DOCUMENTS 294924 11/1971 U.S.S.R. ...................... 64/23

*Primary Examiner*—Charles J. Myhre
*Assistant Examiner*—R. C. Turner
*Attorney, Agent, or Firm*—Neal J. Mosely

[57] ABSTRACT

A shock sub for a well drilling string comprises a tubular housing adapted to be connected to one part of a drill string and a mandrel extending longitudinally into the housing and having an end portion adapted for connection to another part of the drill string. The mandrel and housing are shaped to define a non-circular annular cavity there between when assembled together. A compressible elastic metallic spring means is positioned in and substantially fills the non-circular annular cavity and is compressible longitudinally, radially and circumferentially to absorb longitudinal, radial and torsional vibration and impact loads and to transmit rotary movement between said housing and mandrel for imparting rotation from one part of the drill string to the other part connected by the drill sub. The spring means is preferably a knitted wire fabric or rope compressed into a compact mass capable of spring deflection in longitudinal, radial and circumferential directions relative to said shock sub assembly.

17 Claims, 6 Drawing Figures

DRILL STRING SHOCK SUB

BACKGROUND OF THE INVENTION

This invention relates to new and useful improvements in shock subs positioned in the drilling string above the drilling bit to absorb vibrations, shock or impact loading otherwise imparted to the drilling string from the drilling bit during the drilling of wells for production of crude oil, natural gas, geothermal energy, etc.

Large axial displacement drill string vibrations occur in hard formations when drilling against a non-flat surface, a non-homogeneous (hard-soft) surface or a highly fractured surface. When the drilling is carried out using a conventional tricone bit, the vibration or shock or impact loading is multiplied by a factor of three in frequency and substantial impact and vibratory forces are applied in the drill string which results in early failure of tool joints, drill collars, and other portions of the drill string.

Shock absorbers in the form of shock subs which are generally run immediately above the drill bit in a drill string were first developed more than 40 years ago and have been improved in a variety of features over the years since their original introduction. Crowell U.S. Pat. No. 1,767,350 and Archer U.S. Pat. No. 1,960,688 disclose two of the earliest forms of drill string shock absorbers which utilized an elastomeric sleeve to dampen both axial and torsional vibrations. Other U.S. Patents which disclose significant improvements on shock absorbers utilizing elastomeric springs include the following: Gill et al No. 2,025,100, Crickmer No. 2,620,165, Ortloff No. 2,740,651, Vertson No. 2,765,147, Regland No. 2,795,398, No. 3,033,011, Garrett No. 3,099,918, Crane No. 3,156,106, Hughes No. 3,257,827, Wiggins No. 3,274,798, Coulter No. 3,301,009, Hughes No. 3,306,078, Vertson No. 3,323,326, Leather et al No. 3,323,327, Haushalter No. 2,325,132, Davidescu No. 3,503,224, Zerb et al No. 3,660,990, Mason No. 3,949,150.

Another type of rotary shock absorber or shock sub utilizes a compressible fluid as the shock absorbing medium. U.S. Patents illustrating this type of shock absorber include the following: Leathers No. 3,225,566, Frocks No. 3,230,740, Harrison No. 3,350,900, Galle No. 3,382,936, Galle No. 3,746,329, Webb No. 3,998,443.

Still another type of shock absorber utilizes a helical spring as the shock absorbing member. U.S. Patents which illustrate this type of shock absorber include the following: Ponti No. 1,785,559, Reed No. 2,240,519, Allen No. 2,712,437, Warren No. 2,991,635, Blair No. 3,122,902, Karle No. 3,963,228.

Still another form of shock absorber utilizes a torsional spring as the shock absorbing member. U.S. Patents illustrating this principle include the following: Mullins No. 3,947,008, Amtsperg No. 3,939,670, Frocks No. 3,339,380. Manion No. 2,570,577 discloses the use of annular disc type plate springs as shock absorbing elements. Salvatori et al No. 3,383,126 and Falkner No. 3,406,537 disclose the use of wire mesh springs as the shock absorbing member. Garrett No. 3,254,508 and Wiggins No. 3,263,446 disclose the use of a bellows as a shock absorber.

The several forms of shock absorber disclosed in the various patents listed above each have certain deficiencies. The varous spring type shock absorbers utilize a positive drive between the housing and the mandrel of the shock absorber and thus are not capable of absorbing torsional shocks or impacts. The various shock absorbers which use elastomeric springs will absorb torsional shocks or impacts but cannot be used in high temperature operations because of the deterioration of the elastomer at high temperature. Accordingly, there has been a need for a suitable shock sub which will operate under high temperature conditions and will absorb torsional shock or vibrations as well as longitudinal and radial shocks and vibrations.

SUMMARY OF THE INVENTION

This invention comprises a new and improved shock sub for use in a drill string for absorbing longitudinal, radial and torsional vibration and impact loads. The sub includes a housing structure having a mandrel extending longitudinally therein and adapted to have the housing connected to one part of a drill string and the other end of the mandrel to another part of the drill string. Usually the shock sub is connected in the drill string immediately above the drill bit to absorb vibration and impact loads imparted by the bit. The mandrel and housing have a shape which defines a non-circular annular cavity when assembled together. A compressible elastic metallic spring member is positioned in and substantially fills said non-circular annular cavity. The spring member is compressible longitudinally, radially and circumferentially of the cavity to absorb longitudinal, radial and torsional vibrations and impact loads and acts as the sole means to transmit rotary movement between the mandrel and housing upon rotation of the drill string. The housing and mandrel are secured together to maintain the spring member under longitudinal compression. The spring member is preferably a knitted metallic fabric or rope which is compressed to a compact mass and fitted in said annular cavity.

DESCRIPTION OF THE PREFERRED EMBODIMENTS

Figure 1:
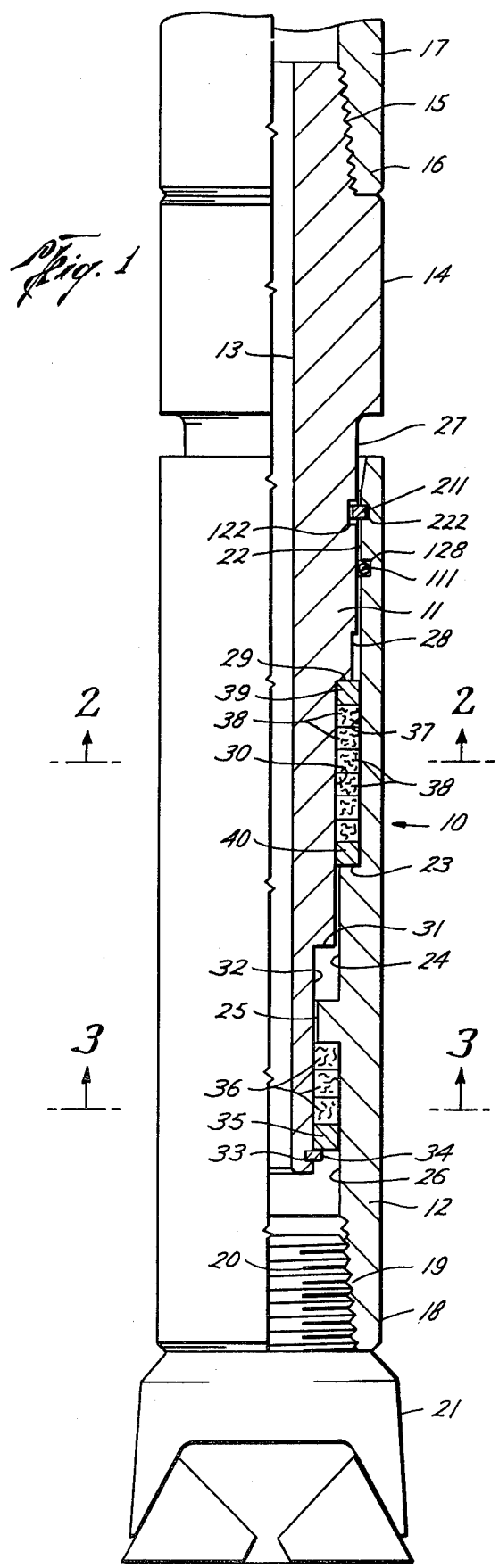
FIG. 1 is a view in partial longitudinal section of a shock sub embodying this invention.

Referring to the drawings by numerals of reference and more particularly to FIGS. 1 to 4, we have shown shock absorber 10 which comprises a mandrel 11 fitted longitudinally in a hollow tubular housing 12. Mandrel 11 is provided with a longitudinal interior passage 13 extending the entire length thereof. The upper end of mandrel 11 is enlarged as at 14 and has a threaded tin portion 15 adapted to be connected within the threaded box end portion 16 of drill string 17 (which may be a drill collar or tool joint). The bottom end 18 of housing 12 includes a threaded box portion 19 which receives the threaded tin 20 of a tricone drill bit 21. Passage 13 provides for the circulation of drilling fluid from drill string 17 through shock sub 10 to circulate past drill bit 21 and remove cuttings from the hole.

Housing 12 has an interior bore 22 extending to shoulder 23 from which extends a smaller bore 24 to inwardly directed flange 25. A lower bore 26 extends from below flange 25 to the threaded box portion 19.

Figure 3:
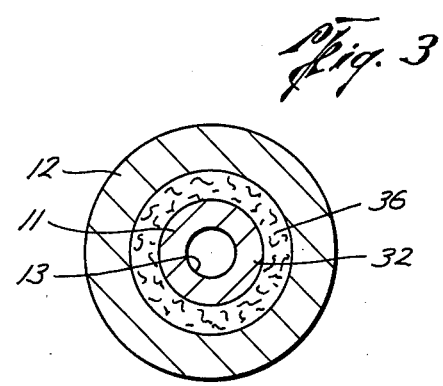
FIG. 3 is a sectional view taken on the line 3—3 of FIG. 1.

Mandrel 11 has an upper surface 27 which is loosely slideable within bore 22 of housing 12. Immediately below surface 27 is a relieved surface area 28 below which is located shoulder 29. Surface 30 of smaller diameter extends from below shoulder 29 to shoulder 31 which is positioned just above flange 25 in housing 12. Below shoulder 31 is a surface area 32 of smaller diameter which extends to the lower end of the mandrel. At the lower end of mandrel 11 is provided a groove 33 in which there is positioned lock ring 34 which supports a solid metal washer 35. A plurality of washers 36 are supported on washer 35 and butt the lower side of flange 25. Washers 36 are of a knitted metal fabric or rope which is compressed into a shape of substantially rectangular cross section as shown. The knitted metal washers 36 are preferably of a corrosion resistant steel (or like corrosion resistant metal) and are compressed to a compact form such that the rebent metal fibers forming the knitted fabric or rope mass are capable of deflection as a spring longitudinally, radially or circumferentially of the space in which they are confined. In FIG. 3, the arrangement of the washers 36 is seen in a bottom cross sectional view.

Figure 2:
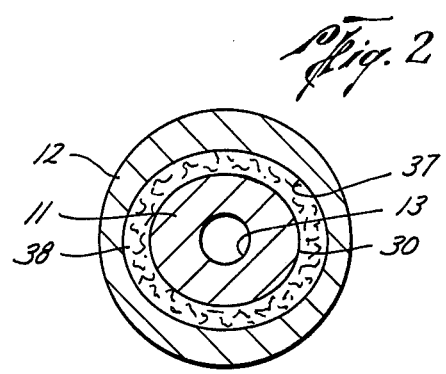
FIG. 2 is a sectional view taken on the line 2—2 of FIG. 1.
Figure 4:
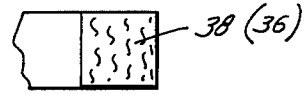
FIG. 4 is a detail sectional view, slightly enlarged relative to FIG. 1, illustrating the knitted wire spring member used in the shock sub.

The space between mandrel 11 and housing 12 at the upper middle portion of the shock sub is illustrated in FIG. 2. The exterior surface 30 of mandrel 11 and the interior surface 37 of housing 12 are of a shape which defines a non-circular cavity when assembled as shown. In the embodiment shown in FIG. 2, the non-circular cavity is elliptical or oval in shape. Within the non-circular cavity defined by surfaces 30 and 37 there are positioned a plurality of washers 38 which are substantially identical in structure to the washers 36 described above. The washers 38 are of a knitted wire fabric or rope which is compacted into a compact mass, preferably of substantially rectangular cross section. In FIG. 4 there is shown a detail sectional view, somewhat enlarged, of the washers 36 and 38. As noted above, the knitted wire washers are of corrosion resistant steel wire or the like and are compacted so that the rebent knitted wires will function as springs when flexed longitudinally, radially or circumferentially of the cavity in which they are confined. Washers 38 abut a solid metal washer 39 positioned against shoulder 29 on mandrel 11 and abut a solid metal washer 40 positioned on shoulder 23 on housing 12.

When the shock sub is assembled as illustrated and described above, the washers 36 are under compression and function as a spring means holding washers 38 under longitudinal compression between solid washers 39 and 40. The washers 36 and 38 are compressible springs in directions longitudinally, radially and circumferentially of the cavities in which they are confined. These washers therefore function to absorb and dampen vibrations or impact loads which are imparted longitudinally or radially or torsionally in the apparatus. Rubber "O" ring 111 in groove 128 seals the sub against fluid ingress. Lock ring 211 positioned in grooves 122 and 222 secures the sub together. The non-circular cavity in which washers 38 are confined, and the fact that the washers are compated and fit tightly in that cavity, results in washers 38 functioning as the means to transmit rotary motion between mandrel 11 and housing 12 when drill string 17 is rotated. There are no splines or other direct drive connections between mandrel 11 and housing 12. The non-circular washers 38 provide the only means for transmission of rotary movement from mandrel 11 to housing 12. It should be noted, however, that the major axis of the elliptical cross section of mandrel 11 is preferably slightly larger than the minor axis of the elliptical cross section of housing 12 so that the surfaces will meet and jam, resulting in direct transmission of rotary motion in the event of a total failure or collapse of knitted wire washers 38. The arrangement thus described is capable of dampening and absorbing vibrations or impact loads both longitudinally and radially of the shock sub and also to absorb or dampen torsional vibrations or impacts. In addition, the spring means 38 is not damaged by elevated temperatures which would completely destroy the operating characteristics of an elastomeric spring.

Figure 5:
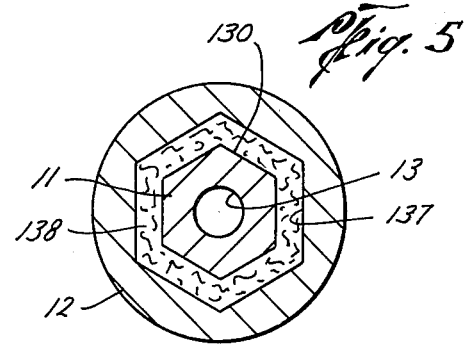
FIG. 5 is a sectional view taken on the line 2—2 of an alternate embodiment of the invention.
Figure 6:
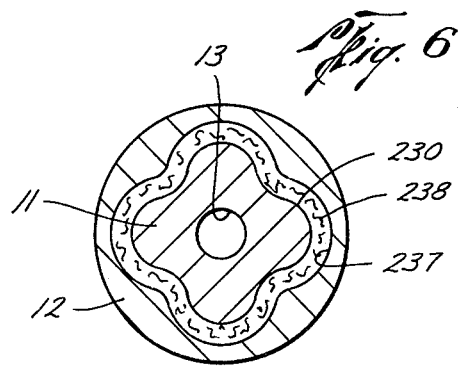
FIg. 6 is a sectional view taken on the line 2—2 of still another alternate embodiment of the invention.

The apparatus described above relies upon the non-circular shape of the cavity between mandrel 11 and housing 12 and the corresponding non-circular shape of washers 38 which fill that cavity to transmit rotary movement between drill string 17 and bit 21. Other non-circular shapes can be used to transmit rotary movement between mandrel 11 and housing 12. Two such embodiments of the inventive concept are shown in FIGS. 5 and 6 of the drawings. In FIG. 5 housing 12 is shown to have inner surface 137 of a polygonal shape, i.e., hexagonal. The exterior surface 130 of mandrel 11 is of a similar polygonal shape. The knitted wire washers 138 are shaped to fit the non-circular cavity shown. Washers 138 are identical in construction with washers 36 and 38. In this embodiment, as in the embodiment of FIGS. 1 to 4, the non-circular surface of mandrel 11 is of a size such that it will not completely rotate within the correspnding non-circular cavity of housing 12. In FIG. 6, there is shown an embodiment of the invention in which the inner surface 237 of housing 12 and the outer surface 230 of mandrel 11 are sinusoidal or serrated in shape and define a like cavity for knitted wire washers 238. As in the other embodiments, the dimensions of mandrel 11 are such that it will not completely rotate within the cavity defined in housing 12.

While this invention has been described fully and completely with special emphasis upon several preferred embodiments it should be understood that within the scope of the attended claims the invention may be practiced otherwise than as specifically described herein.

I claim:

1. A shock sub for use in a drill string for absorbing longitudinal, radial, and torsional vibration and impact loads comprising a tubular housing adapted for connection to one part of a drill string, a mandrel extending longitudinally into said housing and having an end portion adapted for connection to another part of a drill string, said mandrel and said housing each having a shape defining a non-circular annular cavity when assembled together, compressible, elastic, metallic spring means positioned in and substantially filling said non-circular annular cavity, such springs means being compressible longitudinally, radially and circumferentially of said cavity to absorb longitudinal, radial and torsional vibration and impact loads and to transmit rotary movement between said housing and said mandrel upon rotation of one of said members by said drill string, and means securing said housing and mandrel together to maintain said spring means in longitudinal compression.

2. A shock sub according to claim 1 in which said spring means comprises a knitted metal wire fabric compressed into a compact mass.

3. A shock sub according to claim 1 in which said spring means comprises a knitted wire rope compressed into a compact mass.

4. A shock sub according to claim 1 in which said spring means comprises a plurality of annular washers filling said non-circular cavity, each of said washers comprising a knitted metal wire fabric compressed into a compact mass.

5. A shock sub according to claim 1 in which said spring means comprises a plurality of annular washers filling said non-circular cavity, each of said washers comprising a knitted metal wire rope compressed into a compact mass.

6. A shock sub according to claim 1 in which said spring means comprises a plurality of annular washers filling said non-circular cavity, each of said washers comprising a knitted metal wire fabric compressed into a compact mass of substantially rectangular cross section.

7. A shock sub according to claim 1 in which said spring means comprises a plurality of annular washers filling said non-circular cavity, each of said washers comprising a knitted metal wire rope compressed into a compact mass of substantially rectangular cross section.

8. A shock sub according to claim 1 in which said securing means includes spring means compressible in longitudinal, radial and circumferential directions.

9. A shock sub according to claim 8 in which said last named spring means comprises a knitted metal wire fabric compressed into a compact mass.

10. A shock sub according to claim 8 in which said last named spring means comprises a knitted wire rope compressed into a compact mass.

11. A shock sub according to claim 8 in which said last named spring means comprises a plurality of annular washers, each of said washers comprising a knitted metal wire fabric compressed into a compact mass.

12. A shock sub according to claim 8 in which said last named spring means comprises a plurality of annular washers, each of said washers comprising a knitted metal wire rope compressed into a compact mass.

13. A shock sub according to claim 8 in which said last named spring means comprises a plurality of annular washers, each of said washers comprising a knitted metal wire fabric compressed into a compact mass of substantially rectangular cross section.

14. A shock sub according to claim 8 in which said last named spring means comprises a plurality of annular washers, each of said washers comprising a knitted metal wire rope compressed into a compact mass of substantially rectangular cross section.

15. A shock sub according to claim 1 in which said non-circular cavity is elliptical or oval in cross section.

16. A shock sub according to claim 1 in which said non-circular cavity is polygonal in cross section.

17. A shock sub according to claim 1 in which said non-circular cavity is sinusoidal or serrate in cross section.

* * * * *